(12) United States Patent
Yamamoto et al.

(10) Patent No.: US 6,179,084 B1
(45) Date of Patent: *Jan. 30, 2001

(54) UNDERGROUND ACOUSTIC WAVE TRANSMITTER, RECEIVER, TRANSMITTING/RECEIVING METHOD, AND UNDERGROUND EXPLORATION USING THIS

(75) Inventors: Tokuo Yamamoto, Miami, FL (US); Junichi Sakakibara, Tokyo (JP)

(73) Assignees: Yamamoto Engineering Corporation, Miami, FL (US); Kawasaki Steel Corporation (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/180,924
(22) PCT Filed: Mar. 17, 1998
(86) PCT No.: PCT/JP98/01115
  § 371 Date: Nov. 16, 1998
  § 102(e) Date: Nov. 16, 1998
(87) PCT Pub. No.: WO98/41885
  PCT Pub. Date: Sep. 24, 1998

(30) Foreign Application Priority Data

Mar. 17, 1997 (JP) .................................................. 9-063195

(51) Int. Cl.$^7$ ....................................................... G01V 1/40
(52) U.S. Cl. ............................................. 181/106; 367/912
(58) Field of Search ..................................... 181/102, 103, 181/104, 105, 106; 367/25–35, 911, 912

(56) References Cited

U.S. PATENT DOCUMENTS

| | | | |
|---|---|---|---|
| 3,978,939 | * 9/1976 | Truoiller | 181/104 |
| 4,805,725 | 2/1989 | Paulsson . | |
| 5,031,717 | 7/1991 | Hardee et al. . | |
| 5,042,611 | 8/1991 | Howlett . | |
| 5,044,460 | * 9/1991 | Kamata et al. | 181/102 |
| 5,113,966 | 5/1992 | Gregory et al. . | |
| 5,115,880 | * 5/1992 | Sallas et al. | 181/106 |
| 5,212,354 | 5/1993 | Miller et al. . | |
| 5,229,554 | 7/1993 | Cole . | |
| 5,544,127 | * 8/1996 | Winkler | 181/104 |
| 5,635,685 | * 6/1997 | Tierce et al. | 181/106 |

FOREIGN PATENT DOCUMENTS 63-503326  12/1988  (JP) .
  744410   6/1980  (RU) .

* cited by examiner

*Primary Examiner*—Khanh Dang
(74) *Attorney, Agent, or Firm*—Austin R. Miller

(57) ABSTRACT

On a source side, piezo-electric elements (34) are arranged such that vibration direction is perpendicular to a wall of a bore hole (12), and then an anvil (42) arranged on the piezo-electric elements in a bore hole wall side is pressure-contacted to the wall of the bore hole by a clamping mechanism (64). On a receiver side, upper and lower portion of another bore hole (112) are closed by a packer (182) and a shut-off valve (180), respectively, thereby preventing the fluid from flowing, and a cable (150) above a vibration receiver is fixed to the wall of said another bore hole (112) by a clamping mechanism (164), thereby reducing noise propagating through the cable. This increases measuring depth and crosswell distance of petroleum exploration and soil investigation by acoustic tomography, which causes applicability to be spread.

38 Claims, 13 Drawing Sheets

UNDERGROUND ACOUSTIC WAVE TRANSMITTER, RECEIVER, TRANSMITTING/RECEIVING METHOD, AND UNDERGROUND EXPLORATION USING THIS

TECHNICAL FIELD

The present invention relates to a device and method for transmitting acoustic wave into underground, for receiving the acoustic wave, and an underground exploration method using above mentioned device. More specifically, the present invention relates to a device and method for transmitting acoustic wave into underground, for receiving the acoustic wave, and an underground exploration method using the same, which are preferably used for obtaining a cross section of porosity image and permeability image and variations of sedimentary material, and of shear modules and shear strength, and the like of sedimentation layer and rock layers, at the exploration of oil and ground water, and the soil investigation for plan and design of civil engineering work and foundation work.

BACKGROUND OF TECHNIQUE

The conventional borehale measurement method is restricted in measurement range or distance to a periphery of the bore hole when executing the method electrically or magnetically, thereby disabling a measurement between bore holes. A technique of solving this problem includes a seismic exploration method using an elastic wave or a shear wave. However, in the existing seismic exploration method, a steel casing for protecting the hole wall has a problem related to the coupling, and a vibration source has some problems, thereby disabling the satisfactory investment to be carried out. For example, there is disclosed a technique of emitting the vibration energy outside the hole wall by vibrating a mass up and down and left- and right-hand using hydraulic system, and closely contacting it to the hole wall by a clamp (U.S. Pat. Nos. 5,229,554, 4,923,030, 4,648,478, 4,991,685, 4,796,723, 5,031,717, 5,212,354, 5,113,966, and 4,805,725).

But, the vibration caused by a hydraulic system cannot exhibit the stable output in a wide frequency range, particularly a high frequency range of more than 1 kHz, which provides the defect that it is difficult to use a signal compression technique using a pseudo random signal, and the like. Also, the large output vibration source disclosed by the representative U.S. Pat. No. 4,805,725 is capable of transmitting the receivable energy by .enlarging the output without using the signal compression technique. However, the measurement is difficult in the high frequency range, thereby making it difficult to improve the measurement accuracy, and further it is impossible to carry out the measurement while changing the frequency, thereby making it difficult to calculate the information, such as the permeability values, which is obtained from the sound propagation characteristics. Moreover, a device installed on the ground for generating the large output becomes very large, thereby increasing the time and the cost which are required for the preparation of the measurement such as the movement of the measuring equipment, and the measurement itself.

On the other hand, The vibration source (U.S. Pat. No. 5,042,611), called bender type, in which the vibrator vibrates like a cord is capable of emitting the pseudo random signal and keeping high output. However, it has a problem on the durability of the vibrator, which makes it impractical.

According to the prior invention which was previously invented by the inventor, the permeability and the porosity of the sediments, and the nature of the pore-fluid (oil, gas, and/or water) within the sediment pore space is remotely determined and imaged through the crosswell tomography (See Japanese Patent Provisional Publication (Kokai) No. 4-198794), and the like, which was proposed by the present inventor. The crosswell tomography enables to measure the sound velocity and attenuation at high frequencies (typically 500 to 6000 Hz).

However, this acoustic tomography has been limited to a relatively low frequencies of the order of 100 Hz in order to sufficiently ensure the measurement distance. Acquisition of high frequency (500–6000 Hz) seismograms across two wells separated a long distance has been difficult because of the following reasons:

1. High attenuation of sound through sediments,
2. High level of ambient noise in the receiver wells,
3. Noise through receiver cable caused by wind and ground machines, and
4. The loss of the source energy by well casings.

This problem has been overcome substantially by the technique of the pseudo random binary sequence code measurement (hereinafter referred to as "PRBS measurement") by the present inventor, which is one of the signal compression techniques. This technique utilizes an omnidirectional acoustic source 14 which continuously generates a PRBS signal into all directions in a well 12 drilled in a formation 10, for transmitting underground acoustic wave, a vibration receiver comprising an array of hydrophones in another well, and a real time PRBS recorder capable of averaging and cross-correlating in real time without being subjected to the restriction of the measuring time and the length. The boring investigation of the well reveals that the obtained two-dimensional image of porosity, permeability, shear strength, and the like are correct.

For the case of PVC (vinyl chloride) cased wells having a casing 16 comprising a PVC pipe, such as for ground water and well for foundation engineering, crosswell tomography measurements have been successfully made to crosswell distance of up to 600 m with PRBS frequencies up to 6000 Hz using the above technique. From this data, accurate two-dimensional images of the permeability, porosity and shear strength have been obtained. For the PVC pipe, the acoustic impedance of well fluid (water) is approximately the same as that of PVC, so that the acoustic source 14 does not have the energy loss when the energy passes through the substances which are different in impedance from one another, which enables sufficient energy to effectively propagate in the ground through the casing 16.

However, for the steel cased wells, such as a deep well for producing oil, the impedance of steel is two order of magnitude larger than that of water or oil, thereby increasing the transmission loss at the casing pipe wall as shown by the arrow A, and then causing the energy to be dispersed upward and downward, as shown by the arrow B, which disables the acoustic source 14 to transmit only very low acoustic energy to the formation 10 through this steel casing 16 for oil well. For example, in the experiment of the crosswell tomography by the original PRBS system using the conventional acoustic source, which was carried out at the production oil field of Trinidad Tobago in October 1996, new oil reservoir was discovered by the successful crosswell tomography at the PRBS frequency of 500 Hz in 300 m deep×100 m wide section. Also, it was discovered that the conventional method has the loss of the acoustic energy due to the steel casing, which was as large as substantially 55 dB, that is, 99%. In other words, the steel casing can pass only 1% of the acoustic energy to the formation.

On the other hand, as the source for providing a vibration in the ground, it is expected to dispose a clamping mechanism 24 on a source vibrator 20 provided with an axial direction-wise actuator 22, and then to directly fix the both sides of the upper portion of the axial direction-wise actuator 22 to the casing 16 as shown in FIG. 19. In the drawing, reference numeral 26 designates a motor pump, and 28 a cable.

However, thus clamping the source vibrator 20 at its both sides causes the vibration generated by the axial direction-wise actuator 22 to be unfavorably released in a direction opposite to such a direction that the vibration should be propagated, which deteriorates the efficiency. Further, the axial direction-wise actuator 22 vibrates in the axial direction, which enables only the up and down transverse wave (shear wave) to propagate in the formation 10, but which disables the longitudinal wave (compression wave) to propagate therein. Further, the frequency characteristics are very bad, which provides problems that although the propagation at near 100 Hz is ensured, the propagation at the other frequency ranges are not ensured, and the like.

SUMMARY OF THE INVENTION

The present invention has been made in order to solve the above-mentioned conventional problems. It is therefore a first object of the present invention to further improve the above-mentioned techniques and then enable efficiently energy to propagate in the formation in a necessary direction even when using a casing, that is, steel pipe, having a large energy loss in the conventional technique, thereby providing the highly accurate measurement between the wells which are located away from by a long distance at high frequencies ranging from 500 to 6000 Hz.

It is a second object of the present invention to reduce the noise of a vibration receiver, thereby providing the highly accurate measurement between the wells which are located away from by a long distance The present invention provides a device for transmitting an acoustic wave into underground, arranged in a bore hole for propagating an acoustic wave in the ground, characterized by including a source vibrator which comprises: a mass body arranged in an axial direction of is the bore hole; a vibrator, made of a material of transforming a voltage change to a one-directionwise volume change, disposed on the mass body such that the vibration direction is perpendicular to or parallel with a wall of the bore hole; an anvil disposed on a side of the wall of the bore hole of the vibrator and contacting to the wall; and a clamping mechanism for pressure-contacting the anvil to the wall of the bore hole. This enables the energy of the source vibrator to effectively propagate in the ground in a necessary direction through the well casing, which causes the above-mentioned first object to be solved.

The present invention is different from the conventional technique in that there is utilized the device for obtaining a stable output at a high frequency range by using the vibrator comprising material for accurately transforming a voltage change to a volume change, such as piezo-electric elements and super magnetostrictive materials. The disadvantage that the output energy is less compared with the case of the hydraulic system can be compensated by utilizing the signal compression technique using the pseudo random signal, and the like. On the contrary, the mechanical vibration generating device such as the hydraulic system is incapable of outputting the pseudo random signal.

Moreover, the present invention solves the above-mentioned first object by arranging a balloon type reflection plate for preventing the dissipation of the energy above and/or below the vibrator.

Besides, the present invention is capable of propagating a pseudo random coded acoustic wave, widely ranging from a low frequency to high frequency (several ten Hz to several ten kHz), which is one of the signal compression techniques.

Moreover, the present invention provides a device for receiving an underground acoustic wave, disposed in a bore hole for receiving an acoustic wave propagated in the ground, characterized by comprising: a packer for closing a bottom portion of the bore hole; a shut-off valve for closing a ground outlet of the bore hole; a clamping mechanism for fixing a cable, arranged above a vibration receiver in the bore hole, to a wall of the bore hole and decrease the tension of the cable arranged above the vibration receiver and then relax the cable. This reduces the background noise in the receiver side well and the noise caused by wind and machines on the ground and propagating through the cable, which causes the above-mentioned problem to be solved.

BEST MODE FOR EXECUTING THE INVENTION

Embodiments of the present invention will be described hereinafter with reference to the drawings.

Figure 1:
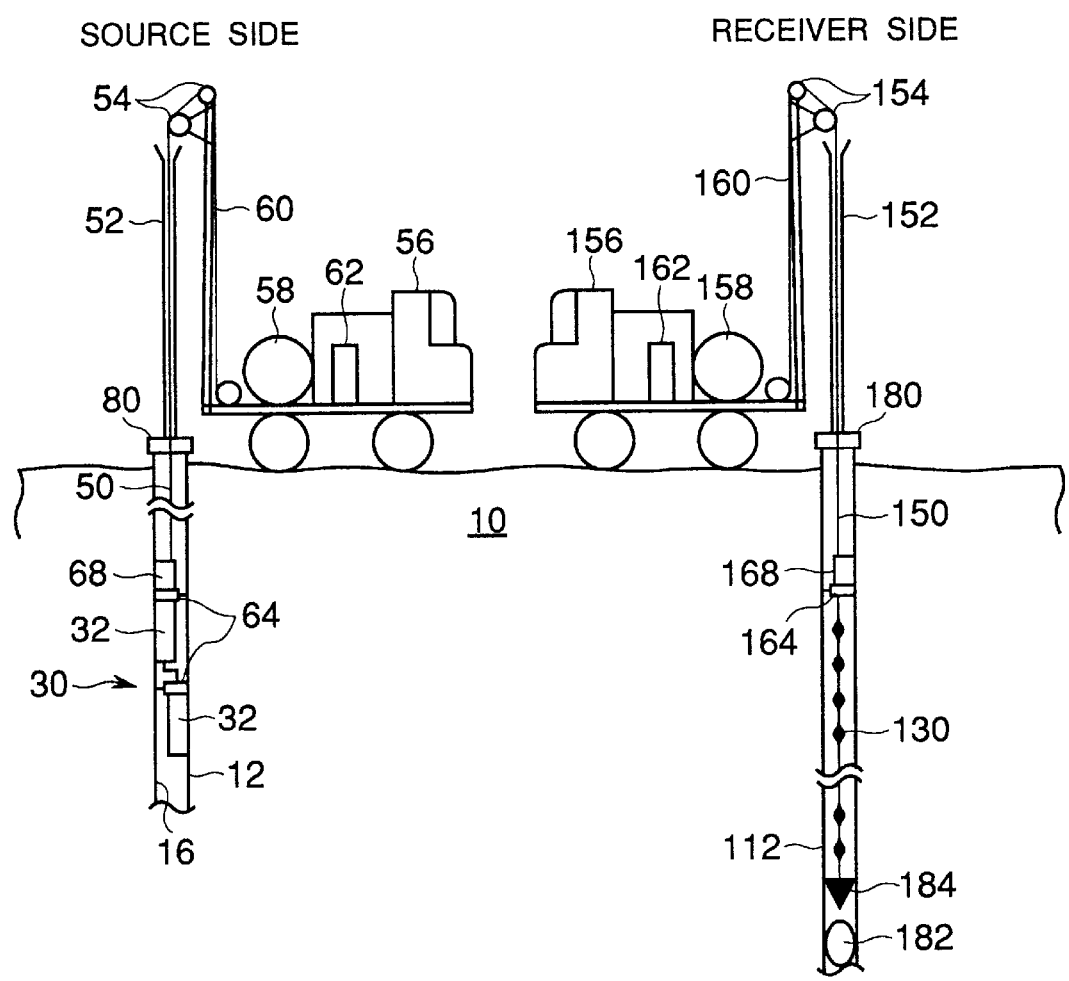
FIG. 1 is a sectional view showing a state in which there is executed an underground exploration method using a first embodiment of a vibration transmitting device and a vibration receiving device according to the present invention.

FIG. 1 shows a state in which an underground exploration method is executed using a first embodiment of a vibration transmitting device and a vibration receiving device according to the present invention.

A vibration transmitting device 30 according to the present invention is installed in a well 12 cased by a steel pipe on a source side, by a source side sheathed electric cable 50 of high voltage. The cable 50 is lubricated by a grease in a lubricating pipe 52 arranged on the well 12 in order to facilitate its installation, and the tension of the cable 50 is balanced by a tension balance pulley 54 disposed at the highest location of the rig. This tension balance pulley 54 relieves the over-tension of a cable winding electric winch 58 to protect the cable and the equipment.

The vibration transmitting device 30 is movable up and down in the well 12 by, for example, the winch 58 mounted on a truck 56 and the well tower 60. The vibration transmitting device 30 is fixed at a depth suitable for the measurement due to the horizontal force of, for example, 5000N by a hydraulic clamping mechanism 64. In the drawing, reference numeral 62 designates a PRBS generator for transmitting a vibration signal to the vibration transmitting device 30.

The vibration transmitting device 30 is driven so as to generate a horizontal force in one direction (right direction in FIG. 1) by a PRBS code continuing over the period of duration in order to obtain a seismic record of high SN ratio by a vibration receiver (hydrophone array 130 in this embodiment) arranged in another (receiver side) well 112. When the measurement for a certain measurement depth is completed, the hydraulic clamping mechanism 64 is released, and then the vibration transmitting device 30 is moved to the next measurement depth.

In the receiver side well 112 is arranged a hydrophone array 130 of, for example, 24 channels which is supported by a receiver side electric cable 150 containing, for example, 50 wires. On an upper end of the receiver side well 112 are disposed a shut-off valve 180 for perfectly block the movement of the liquid entering into the well 112 from a formation 10, as well as a lubricating pipe 152, a tension balance pulley 154, a truck 156, an electric winch 158 and a well tower 160, which are similar to those of the source side. In this embodiment, a shut-off valve 80 which is similar to that of the receiver side well 112 is disposed at an entry of the source side well 12 also.

A packer 182 is disposed on a bottom portion of the receiver side well 112, for closing its bottom portion. A clamping mechanism 164 is disposed on an upper portion of the hydrophone array 130 suspended by a weight 184, for releasing the tension of the cable 150 between the winch 158 and the uppermost hydrophone, which causes a cable noise to be removed, which is caused by the wind and the ground machines and then transmitted through the cable 150 when the cable 150 is tensioned. In the drawing, reference numeral 162 designates a data acquiring system for acquiring a data obtained by the hydrophone array 130.

For the purpose of shortening the measuring time, there can be employed a plurality of the receiver wells 112 for simultaneously measuring the seismic record of crosswell tomography in a number of sections.

Figure 2:
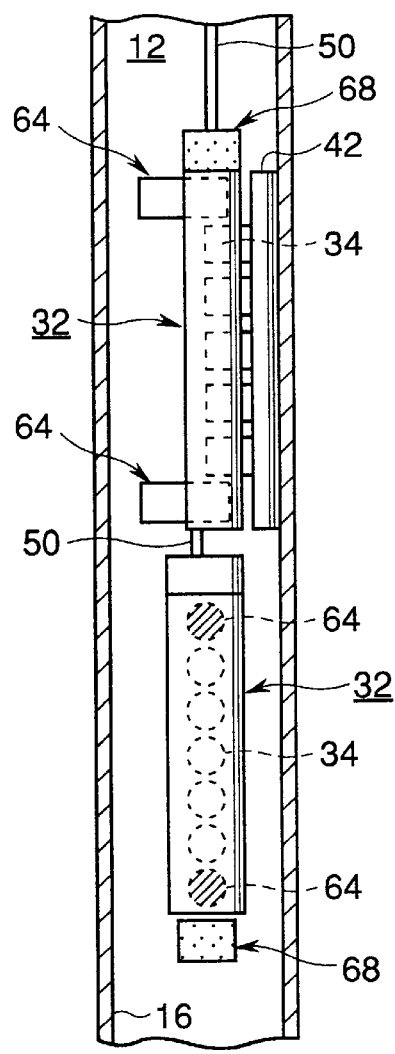
FIG. 2 is a side view showing the structure of the vibration transmitting device according to the first embodiment.
Figure 3:
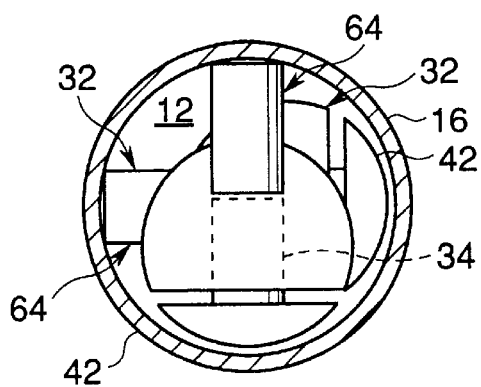
FIG. 3 is a lateral side view of the same.

As shown in detail in FIG. 2 (side view) and FIG. 3 (lateral section view), the vibration transmitting device 30 comprises a pair of vibrators 32 according to the present invention, having basically the same construction, respectively, which are stacked into two layers such that their acoustic wave transmitting directions are perpendicular to each other, the hydraulic clamping mechanism 64 for fixing the respective vibrators 32 in the well 12, and a hydraulic oil source 68 for supplying the hydraulic pressure required by the respective hydraulic clamping mechanisms 64. The upper and the lower vibrator 32 are coupled with each other through a material, hard to transmit the acoustic wave, such as a hard rubber.

Figure 4:
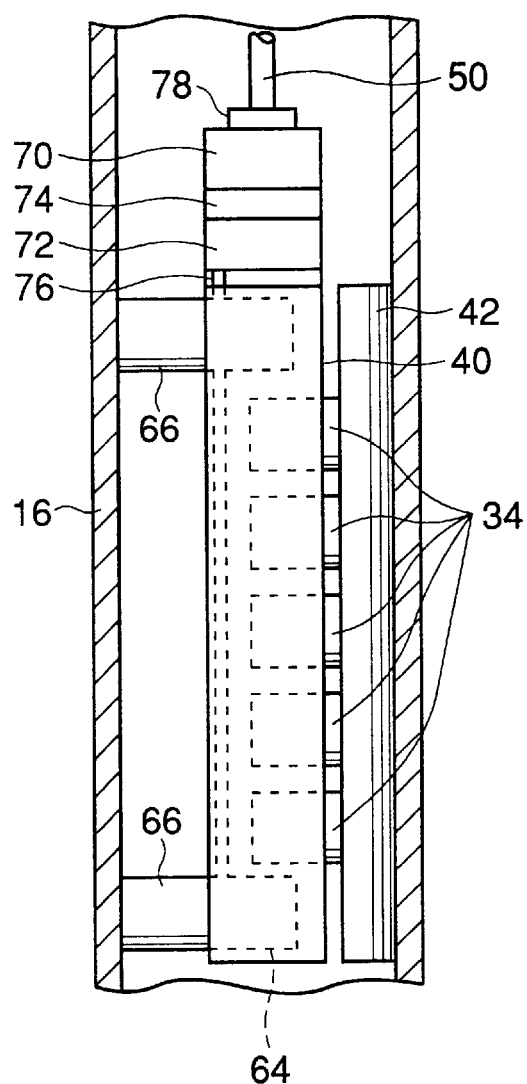
FIG. 4 is a side view of the structure of a vibrator used in the vibration transmitting device.
Figure 5:
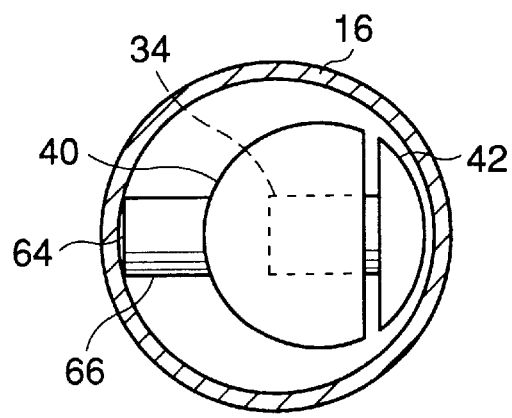
FIG. 5 is a lateral side view of the same.
Figure 6:
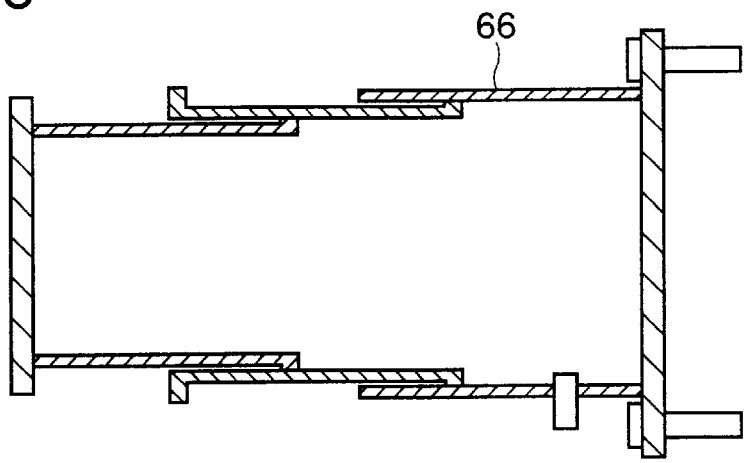
FIG. 6 is a longitudinal sectional view showing the structure of a telescopic hydraulic piston used in a clamping mechanism which is arranged on the upper and the lower portion of the vibrator.
Figure 12:
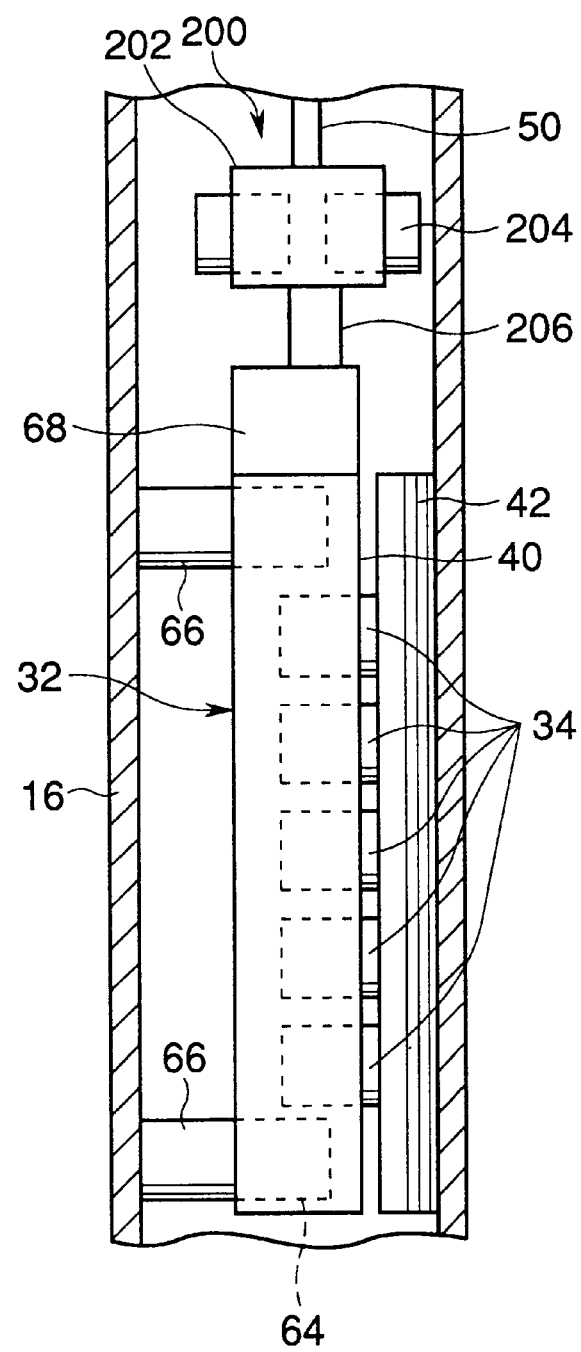
FIG. 12 is a side view showing the structure of a second embodiment of the vibration transmitting device provided with a turning mechanism.

As shown in detail in FIG. 4 (side view) and FIG. (lateral sectional view), on the upper and the lower portion of each of the vibrators 32 are disposed the hydraulic clamping mechanisms 64 each comprising a telescopic hydraulic piston 66 having the construction shown in FIG. 6 for fixing the vibrator 32 to an inner wall of the well casing 16 and then releasing it after the propagation of the PRBS signal at the measuring depth is completed, an oil tank 70 constituting the hydraulic oil source 68, a hydraulic pump 72, and an electric motor 74 for driving the hydraulic pump 72. In FIG. 12, reference numeral 76 designates a hydraulic pressure line and 78 designates a connector.

The electric motor 74 receives a power from the truck 56 on the ground through the cable 50, which enables the hydraulic clamping mechanism 64 to be remotely controlled by an electrical signal from the ground. In this embodiment, a differential pressure type hydraulic pump is employed as the hydraulic clamping mechanism 64, which eliminates the need for air pipes for use in the hydraulic pump.

Total four hydraulic pistons 66 disposed on the upper and the lower portion of the vibrators 32 simultaneously receive a predetermined differential pressure, respectively, to thereby extend, in order to compensate a predetermined fixing force to each of the two vibrators 32. The telescopic hydraulic piston 66 can fix the vibrator 32 in the well with or without a casing having an inner diameter, for example, ranging from 4 inches (about 10 cm) to 8 inches (about 20 cm). The clamping force can be set to a sufficiently large value. For example, when a necessary amplitude of the vibration force is 2000 N, the clamping force of the piston is set to 2500 N to prevent the vibrator 32 from loosing at the time of the propagation. The clamping force is monitored and then feedback-controlled by a differential pressure gauge for monitoring the difference between the outside pressure and the inside pressure in the machine side system. The hydraulic pump 66 is so designed to have the maximum clamping force such that the difference pressure is 2500 N or 3000 psi.

Figure 7:
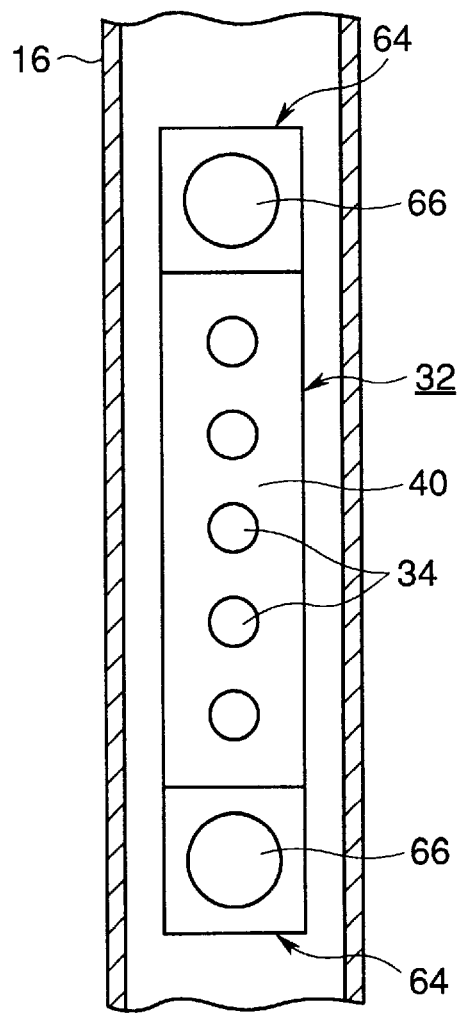
FIG. 7 is a front view of the vibrator.

As shown in FIG. 7, the vibrator 32 comprises a mass body 36 made of, for example, stainless steel arranged in the axial direction of the well 12 receiving five piezo-electric element layered bodies 34, for example, having a diameter of 30 mm, and a length of 50 mm.

Figure 8:
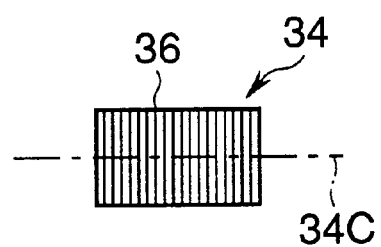
FIG. 8 is a longitudinal sectional view of the structure of piezo-electric element layered bodies used in the vibrator.

Each of the piezo-electric element layered bodies 34 comprises 40 piezo-electric disks 36, each being, for example, 1.25 mm in thickness, layered from one another as shown in FIG. 8, and then electric terminals are fixed between the respective disks 36 by conductive adhesives (for example, epoxy), respectively. Applying an alternating voltage of, for example, the maximum 800 V to each of the disks having a thickness of 1.25 mm causes the piezo-electric element layered bodies having a thickness of 50 mm to generate a linear vibration having an amplitude of 10 $\mu$m when its both ends are free, and to urge the vibration force having an amplitude of 280 N when the both ends of the layered body 34 are fixed. The proper frequency of this system is 2000 Hz, which makes the vibration amplitude larger than the static displacement of 10 $\mu$m all over the frequencies ranging from 0 to 3000 Hz.

An anvil 42 made of, for example, stainless steel is disposed on a front face of the five piezo-electric element layered bodies 34, for connecting them. Thus connecting the front faces of the five piezo-electric layered bodies 34 to the anvil 42 causes the vibration due to the respective piezo-electric element layered bodies 34 to be synthesized, which enables sufficient energy to be propagated even if the frequency is too low for one of the piezo-electric element layered bodies to output.

The surface of the anvil 42 is worked so as to be shaped like, for example, a grater in order to control the attenuation of the pressure-fitting effect due to the contamination such as a compound sulfide attached to the iron casing.

Figure 9:
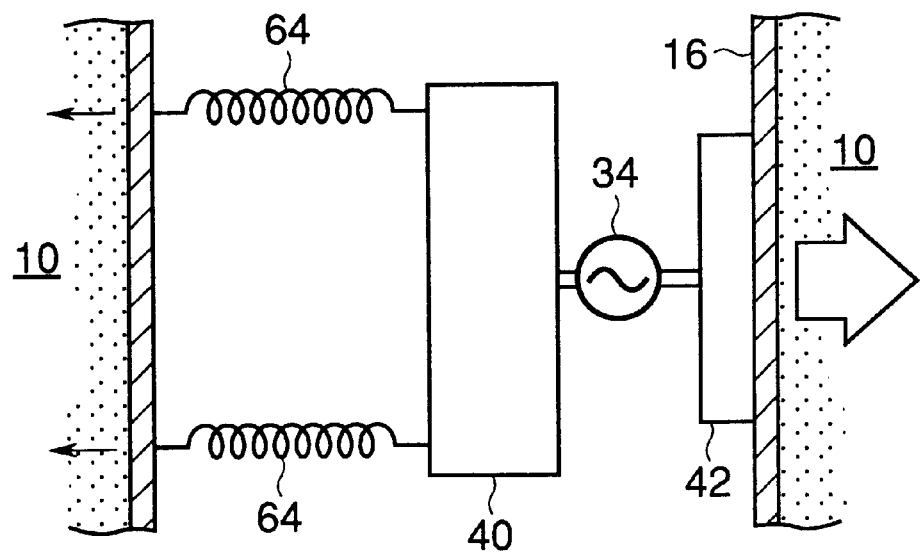
FIG. 9 is a schematic diagram showing a state in which the vibration is propagated in the above embodiment.

In this way, moving the hydraulic piston 66 by the hydraulic pump 72, pressure-fitting one end of the piezo-electric element layered bodies 34 to the casing 16 through the anvil 42, and then fixing the other end to the casing 18 through the hydraulic piston 66 enables the vibration force caused on the piezo-electric element layered bodies 34 to be efficiently transmitted to the formation 10 through the casing 16 as shown In FIG. 9, schematically. In other words, the vibration energy from the piezo-electric element layered bodies 34 is transmitted to the anvil 42, but does not transmitted to the casing through the hydraulic clamp due to the difference of the acoustic impedance between the hydraulic clamp and the anvil. In this way, employing the fluid such as an oil for the clamping mechanism prevents the dissipation of the vibration energy through the clamping mechanism.

Moreover, the number of the piezo-electric element layered bodies 34 may be one. Also, a super magnetostrictive material can be employed instead of the piezo-electric element.

Figure 10:
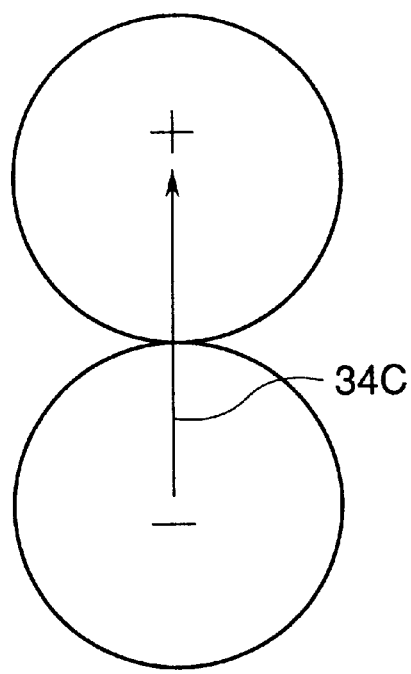
FIG. 10 is a diagram showing a state in which the amplitude of the longitudinal wave generated from the piezo-electric element layered bodies propagates.
Figure 11:
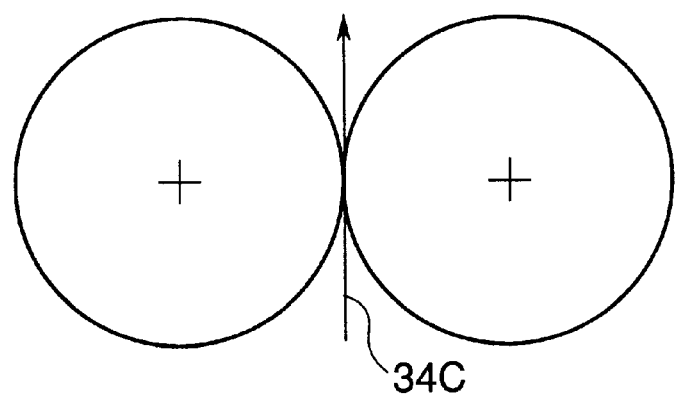
FIG. 11 is a diagram showing a state in which the amplitude of the transverse wave of the same propagates.

There is shown in FIG. 10 and FIG. 11 a pattern of a vibration wave emitted from the vibrator 32. The vibrator 32 acts as a dipole. It is the axial direction 34C of the piezo-electric element layered bodies 34 that the longitudinal wave attains the maximum amplitude. The amplitude attained in the other directions attenuates according to the relation of $\cos\theta$, where $\theta$ designates an angle with such a direction as to exhibit the maximum amplitude. As shown in FIG. 10, the radiation pattern is given by two spherical bodies, one of which is positive, and the other is negative. As shown in FIG. 11, the vibrator 32 generates the transverse wave of two spherical patterns, which attains the maximum in a direction perpendicular to such a direction as that the longitudinal wave attains the maximum amplitude.

In this embodiment, as shown in FIG. 2 and FIG. 3, the upper vibrator and the lower vibrator are disposed such that the axial directions of the respective piezo-electric element layered bodies 34 are perpendicular to each other, which causes the lower piezo-electric layered body to generate the maximum transverse wave toward the receiver side well 112, when the upper piezo-electric layered body is directed such that the longitudinal wave toward the receiver side well 112 attains the maximum amplitude. Accordingly, operating the respective vibrator individually provides the crosswell tomography measurement of the longitudinal wave and the lateral wave. Also, the measurement can be carried out by comparing the two results and then using the piezo-electric element layered body with the larger propagation energy.

Moreover, like a second embodiment of the vibration transmitting device shown in FIG. 12, between the vibrator 32 and the cable 50 can be disposed a turning mechanism 200 including, for example, a direction control gyroscope and motor 202, a hydraulic clamping mechanism 204, and a connecting rod 206, thereby making the vibrator 32 rotatable in the casing 16, which enables the longitudinal or the transverse wave to be propagated in an arbitrary direction.

The main body of the vibrator according to this embodiment is controlled so as to be directed in such a direction to emit the vibration, by the direction control gyroscope and motor 202, which enables a directional acoustic wave to be emitted.

In concrete terms,

1. To monitor the gyroscope and then confirm the current direction of the vibrator.
2. To rotate the main body in such a direction (direction of receiver) as to emit the vibration by the direction control motor (electric drive).
3. To extend the hydraulic clamp (204) after controlling the direction, and then fixing the vibration transmitting portion (anvil) to the iron casing 16.
4. To release the direction control clamp.

This embodiment is particularly useful for the civil engineering for drawing the image of the sediment in the foundation.

Moreover, a compass cannot be used in a deep well cased by the steel pipe, as distinct from a number of oil wells. Also, the gyroscope or the turning mechanism for correcting the azimuth of the piezo-electric element (vibrator) layered body is expensive, and requires the time of adjustment, which cannot be said to be practical. On the contrary, arranging the same vibrators above and below so as to be perpendicular to each other as is the case with the first embodiment shown in FIG. 2 and FIG. 4 prevents when, for example, the axis of the piezo-electric element layered body of the upper vibrator is perpendicular to the direction of the receiver side well, the longitudinal wave from generating in its direction. However, the lower vibrator generates the maximum longitudinal wave in the same direction. For example, when the upper and the lower vibrator are directed so as to cross at an angle of 45° with respect to a direction of the receiver side well 112, the vibrators generate the longitudinal wave having the amplitude of 0.707 times or −3 dB of the maximum longitudinal wave amplitude. Therefore, operating any one of the vibrator provides at least 70% of the maximum longitudinal wave amplitude under any circumstances. Measurement using the PRBS enables the loss of −3 dB to be neglected.

Figure 13:
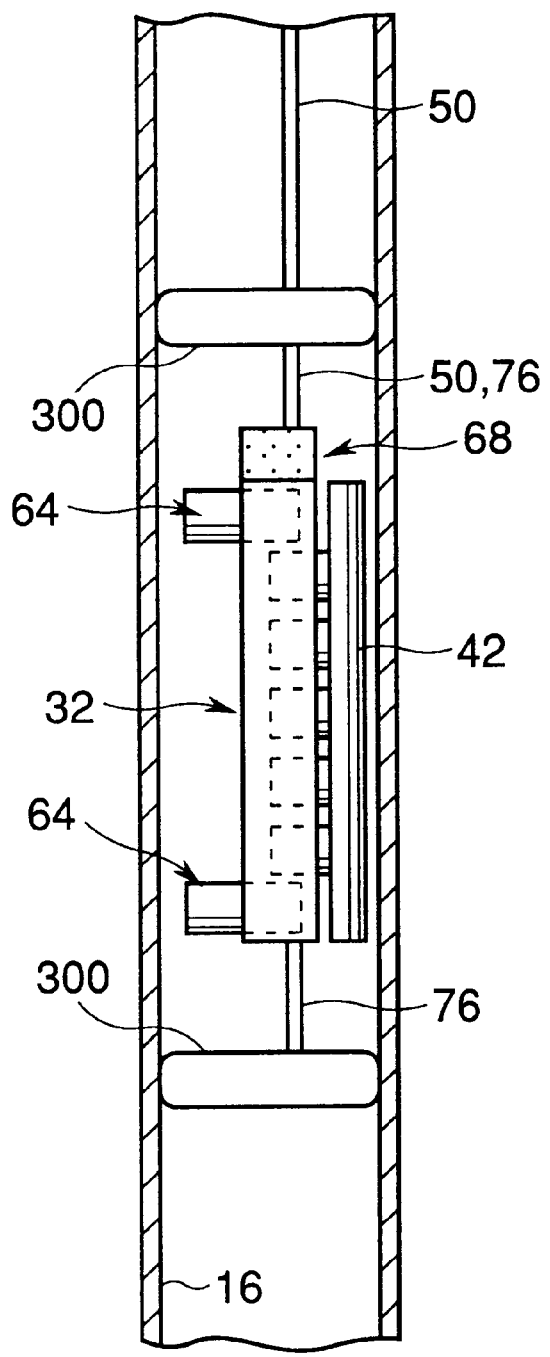
FIG. 13 is a side view showing the structure of a third embodiment of the vibration transmitting device provided with a balloon type reflection plate.

There is shown in FIG. 13 a vibration transmitting device according to a third embodiment of the invention. In this embodiment, above and below a vibrator 32 which is identical with that of the first embodiment are disposed balloon type reflection plates 300. The surface of the source side of the plates are made of material hard to transmit the acoustic wave. Inflating the balloon type reflection plate 300 by using the oil supplied from a hydraulic oil source 68 including, for example, a differential pressure type hydraulic pump, and putting lids on the upper and the lower end of the vibrator 32 prevents the upward and downward dissipation of energy. As circumstances may require, there may be eliminated any one of the upper and the lower reflection plate.

Figure 14:
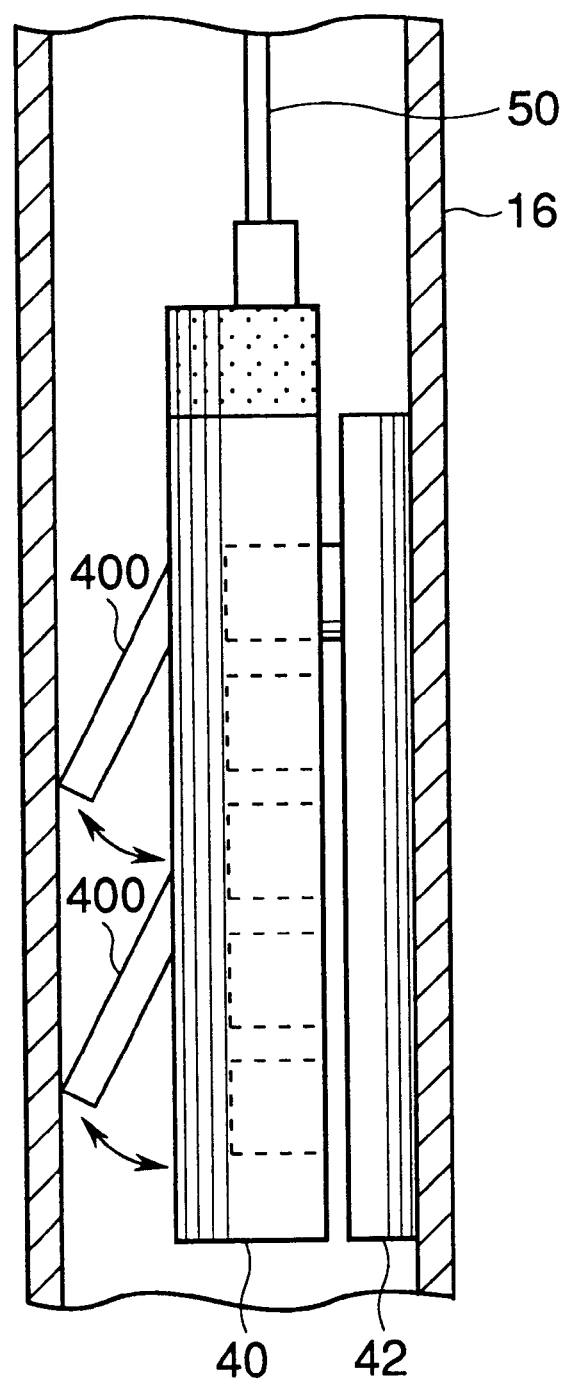
FIG. 14 is a side view showing the structure of a fourth embodiment of the vibration transmitting device provided with a spring type clamp.

This balloon type reflection plate 300 attains a predetermined effect in association with not only the vibrator 32 of the first embodiment, but also the conventional vibrator 14 shown in FIG. 14.

It is effective to lower the noise level of the signal obtained by the hydrophone array 130, as it is effective to raise the output of the vibrator 32 being raised. Two large noise sources having effect on the hydrophone in the receiver side well 112 are given as follows:

1. Environmental noises caused due to a fluid (gases, oil, and water) flowing in the bore hole, and
2. Noises caused by the wind and the machines on the ground and transmitted to the hydrophone from the ground through the cable 150.

The present invention decreases, as shown in FIG. 1, the noise caused due to the fluid flowing and the cable noise to the minimum. Namely, arranging the packer 182 below the desired deepest measuring point and arranging the shut-off valve 180 on the upper end of the well prevents the fluid from flowing into the well 112 including the hydrophone array 130.

Furthermore, the tension of the cable 150 between the upper end of the well and the upper most hydrophone is removed by a hydraulic clamping mechanism 168, using a telescopic hydraulic piston which is identical with the source side well, arranged just above the uppermost hydrophone. Namely, fixing the upper portion of the hydrophone array 130 at a predetermined depth in the receiver side well 112 by the hydraulic clamping mechanism 168 disposed above the upper portion of the hydrophone array 130, and then feeding the cable 150 slightly to relax the cable almost eliminates the noise propagating through the cable 150. The clamping of the hydraulic clamping mechanism 164 is released when carrying out the next measurement, thereby causing the hydrophone array 130 to move up and down in the well 112. The hydraulic clamping mechanism 164 is identical in construction and operation with the source side well, and the description thereof is omitted.

Moreover, the clamping mechanism comprises a hydraulic clamp in the above-mentioned embodiments; however, the clamping mechanism may not be restricted in kind to this hydraulic clamp. Not only a fluid clamp using a fluid other than oil, but also a mechanical clamp such as an eccentric cam or a screw can be employed as each of the source side and receiver side.

Figure 15:
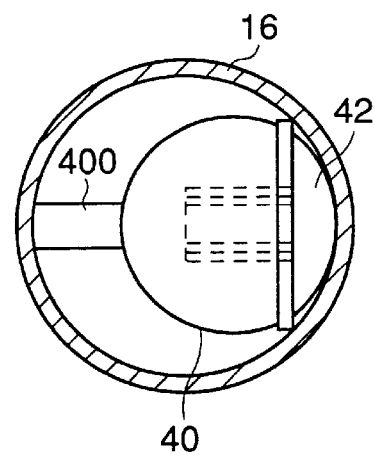
FIG. 15 is a lateral view of the same.

There is shown in FIG. 14 (side view) and FIG. 15 (lateral sectional view) a vibration transmitting device using a spring type clamp 400 according to a fourth embodiment of the present invention.

Further, an electromagnet may be attached to the anvil and the anvil may be magnetized electrically in measurement so as to raise the pressure-fitting effect to the iron casing.

Figure 16:
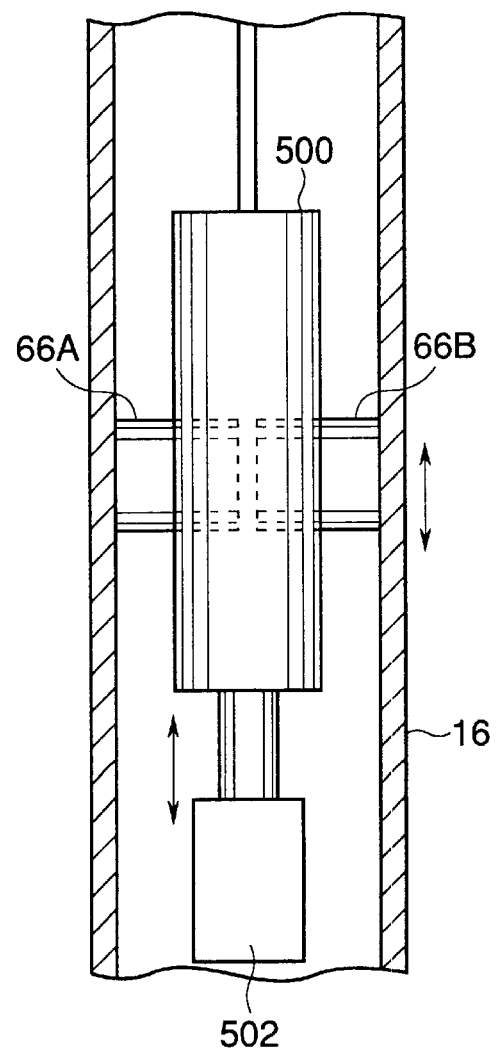
FIG. 16 is a side view showing the structure of a fifth embodiment of the present invention.

Besides, the vibration direction may not be restricted to the vertical to the wall of the bore hole. Like a fifth embodiment shown in FIG. 16, the hole wall may be moved up and down by vibrating a mass body 502 (the lower source vibrator 32 in the first embodiment may be available) hung from a body 500 (the upper source vibrator 32 in the first embodiment may be available) fixed to the wall of the bore hole by a pair of left and right hydraulic pistons 66A, 66B.

The comparisons of the source output in terms of the strike force for the source vibrator according to the first embodiment and a conventional source vibrator in a steel cased well, and a conventional source vibrator in a PVC cased well in the Trinidad sandstone formation are given in Table 1.

TABLE 1

| Frequency (Hz) | Source Vibrator of the present Invention (N) | Conventional Source Vibrator (In Steel Pipe) (N) | Conventional Source Vibrator (In PVC Pipe) (N) |
| --- | --- | --- | --- |
| 125 | 80 | 0.002 | 0.10 |
| 250 | 312 | 0.260 | 13 |
| 500 | 1,250 | 2.120 | 106 |
| 1,000 | 2,000 | 17 | 846 |
| 2,000 | 8,000 | 134 | 6,700 |
| 3,000 | 16,000 | 268 | 13,400 |
| 4,000 | 32,000 | 536 | 26,6000 |

As seen from Table 1, the source vibrator of the present invention transmits 1200 times more energy into the sandstone formation than the conventional source vibrator in a steel cased well at 250 Hz and 120 times more at 1000 Hz. The source vibrator of the present invention transmits much more energy into a sandstone at all frequency even compared with the conventional source vibrator in a PVC cased well. At 500 Hz, the source vibrator of the present invention should be able to transmit high signal to noise ratio PRBS signal to source receiver distance up to 650m without noise reduction. Without noise control at receiver wells, this distance will be extended to 1200m.

Power level (dB) of the source vibrator according to the first embodiment of the present invention in Micropascal/m in the Torinidad sand stones (V=2500 m/s, attenuation=0.25 dB/m/kHz), and transmission distance(m) for frequencies between 32 to 4000 Hz are given in Table 2. Crosswell tomography across a distance of 1 to 7 km through the Trinidad sand stones is possible using PRBS frequencies 32 to 250 Hz. This is very important to image large areas of oil field by a single crosswell experiment. However, in order to do this it is necessary to eliminate not only the noise in the receiver well but also the 60 Hz noise from electric power supplies. It is necessary to build a self-contained battery powered PRBS recorder computer and independent clocks for receivers and source. The vibration transmitting device according to the present invention also transmits high frequency to PRBS longer distance as compare to the conventional vibration transmitting device. The source level of the conventional vibration transmitting device in the Trinidad sand stones in dB is given in the parentheses ( ) in Table 2 for comparisons.

TABLE 2

| Frequency (Hz) | Resolution (m) | Source Level of the present Invention Device (dB) | Output Level of the Conventional Device (dB) | High Noise Transmission Distance (m) | Low Noise Transmissic Distance (m) |
| --- | --- | --- | --- | --- | --- |
| 32 | 32 | 160 | (68) | 2,800 | 7,700 |
| 62 | 16 | 166 | (80) | 1,900 | 4,400 |
| 125 | 8 | 170 | (92) | 1,200 | 2,400 |
| 250 | 4 | 177 | (104) | 750 | 1,400 |
| 500 | 2 | 183 | (116) | 450 | 800 |
| 1,000 | 1 | 185 | (128) | 270 | 430 |
| 2,000 | 0.5 | 187 | (140) | 150 | 230 |
| 4,000 | 0.25 | 190 | (152) | 70 | 130 |

Industrial Applicability

The present invention disclosed herein eliminates the loss due to steel or other casings by replacing the acoustic source by the vibration transmitting device according to the present invention which effectively transmits source energy to the sediment formations through the casings.

In addition, the present invention discloses the art of effectively reducing by up to 40 dB the ambient noise in the receiver wells and the cable noise generated by winds and ground machines which is transmitted through receiver cable by the ambient noise and cable noise reduction system.

The use of either the new source or the noise reduction system, or the combination of the both effectively increases the acoustic signal to noise ratio by 55 to 95 dB. For example, these increases of signal to noise ratio enable to extend the transmission distance of the original PRBS crosswell tomography in the sandstone oil field by 4 to 8 times (from 100 m to 400 m–800 m at 500 Hz), or increase the PRBS frequency 4 to 8 times (from 500 Hz to 2000 Hz–4000 Hz at crosswell distance of 100 m). For limestone oil fields, the crosswell distance would be increased from 100 m to 1000 m–2000 m at 500 Hz. The present invention has dramatically increased the capability to find oil and gas in oil fields and water in underground reservoirs.

Figure 17:
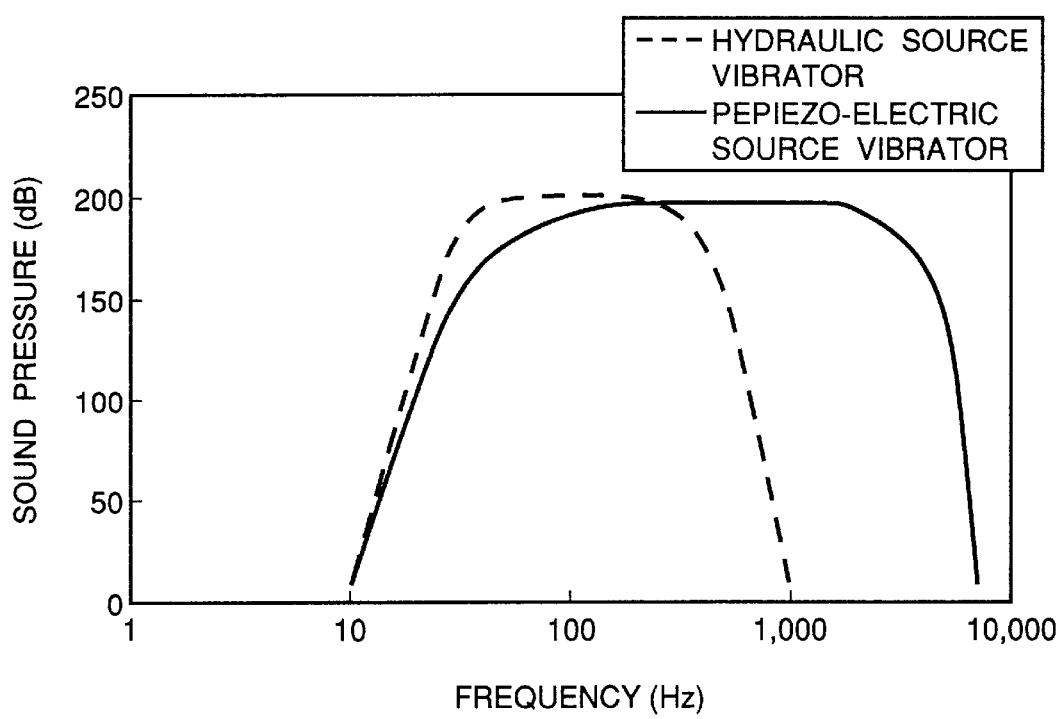
FIG. 17 is a diagram showing the comparison of the frequency characteristics of the sound pressure between a conventional hydraulic vibrator and a piezo-electric type vibrator according to the invention.
Figure 18:
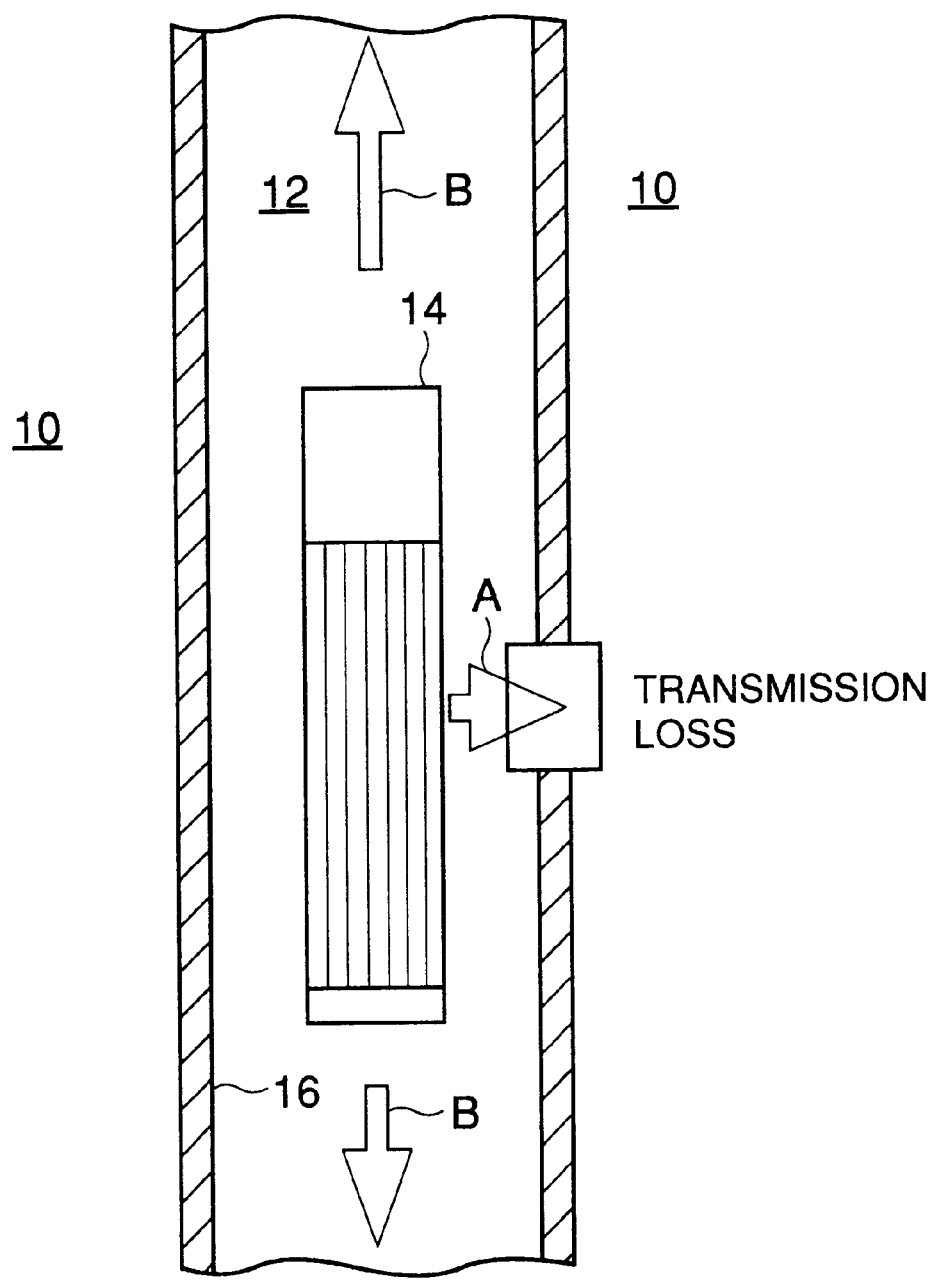
FIG. 18 is a side view showing an example of a vibration transmitting method executed by the conventional vibration transmitting device.
Figure 19:
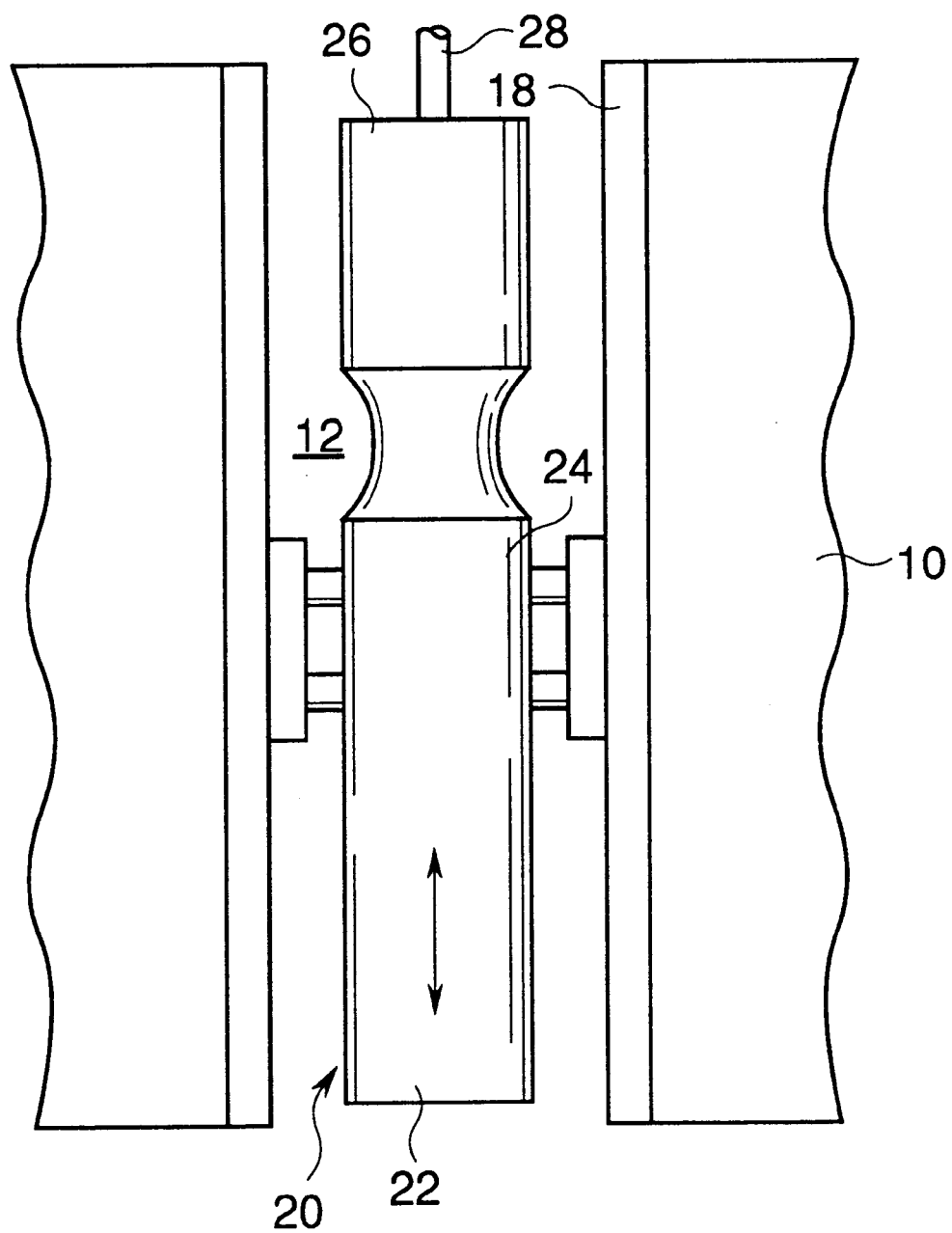
FIG. 19 is a side view showing a clamping method of the conventional another example.

There is shown in FIG. 17 the frequency characteristics of the output of the conventional hydraulic source vibrator (broken line) and the piezo-electric source vibrator according to the present invention (actual line). For the conventional one, the output is extremely decreased at 1000 Hz, whereas for the present invention, the output is stabilized even over 5000 Hz, which shows that the measurement is realized with high accuracy at higher frequency compared with the hydraulic source vibrator.

Moreover, the source vibrator according to the present invention emits the longitudinal wave (compression wave) and the transverse wave (shear wave) in directions perpendicular to each other, respectively, it can be employed as a pure longitudinal wave generator or transverse wave generator when the crosswell tomography for investigating the underground is conducted for the exploration of the underground resources or the civil engineering work.

What is claimed is:

1. An underground acoustic wave transmitting device (30) arranged in a bore hole (12) for transmitting an acoustic wave in ground, characterized by including at least first and second source vibrators (32), with each said source vibrator (32) comprising:
    a mass body (40) arranged in an axial direction of said bore hole;
    a vibrator (34) disposed on said mass body such that the vibration direction is perpendicular to or parallel with a wall of said bore hole;
    an anvil (42) for contacting to said wall, disposed on said bore hole wall side of said vibrator; and
    a clamping mechanism (64) for pressure-contacting said anvil to said wall of said bore hole;
    wherein said first and second source vibrators (32) are substantially aligned with one another in said bore hole, with said first source vibrator (32) having a rotational position substantially 90° from a rotational position of said second source vibrator (32).

2. An underground acoustic wave transmitting device as set forth in claim 1, wherein said anvil (42) is provided so as to connect said bore hole wall side of said vibrators.

3. An underground acoustic wave transmitting device as setforth in claim 1 or 2, wherein said vibrator (34) is constructed by a piezo-electric element, or a super-magnetostrictive material.

4. An underground acoustic wave transmitting device as set forth in claim 1, wherein a surface of said anvil (42) is coarse.

5. An underground acoustic wave transmitting device as set forth in claim 1, wherein a fluid pump (72) for driving a fluid clamp, a fluid tank (70), and an electric motor (74) for driving said fluid pump are mounted on said mass body (40), and said source vibrator (32) and device on the ground are connected to each other through an electric cable (50).

6. An underground acoustic wave transmitting device as set forth in claim 1, wherein said clamping mechanism comprises a fluid clamping mechanism (64) for pressure-contacting said anvil (42) to said bore hole wall by fluid pressure.

7. An underground acoustic wave transmitting device as set forth in claim 6, wherein said fluid clamping mechanism (64) is constructed by using a hydraulic piston (66).

8. An underground acoustic wave transmitting device as set forth in claim 1, wherein said anvil (42) is further provided with an electromagnet type clamping mechanism.

9. An underground acoustic wave transmitting device as set forth in claim 1, wherein a balloon type reflection plate (300) for preventing dissipation of energy is further disposed above and/or below said source vibrator (32).

10. An underground acoustic wave transmitting device as set forth in claim 1, further comprising a turning mechanism (200) for rotating said mass body (40) in said bore hole (12) to change the fixing direction of said anvil (42).

11. An underground acoustic wave transmitting device as set forth in claim 12, wherein said turning mechanism (200) is constructed by using a direction-control gyroscope, a motor (202), and a clamping mechanism (204).

12. An underground acoustic wave transmitting device as set forth in claim 1 further comprising an underground acoustic wave receiving device disposed in a bore hole (112) for receiving an acoustic wave transmitted in the ground, characterized by comprising:
    a packer (182) for closing a bottom portion of said bore hole;
    a shut-off valve (180) for closing a ground outlet of said bore hole;
    a clamping mechanism (164) for fixing a cable (150), arranged above a vibration receiver in said bore hole, to a wall of said bore hole so as to decrease tension of said cable arranged above said vibration receiver and then relax said cable.

13. An underground acoustic wave transmitting device as set forth in claim 1 further comprising a balloon type reflection plate (300) for preventing dissipation of energy above and/or below said source vibrator (32).

14. An underground acoustic wave transmitting device as set forth in claim 13, wherein at least a side surface of said balloon type reflection plate (300) on a side of said source vibrator (32) is made of a material hard to transmit an acoustic wave in said bore hole (12).

15. An underground acoustic wave transmitting device as set forth in claim 1, wherein said vibrator (34) is substantially elongated along a longitudinal axis, with said vibrator (34) being disposed on said mass body such that said longitudinal axis is substantially perpendicular said axial direction of said bore hole.

16. An underground acoustic wave transmitting device as set forth in claim 15, wherein a plurality of said vibrators (34) are disposed on said mass body in the axial direction of said bore hole and at spaced separation from one another.

17. An underground acoustic wave transmitting method for transmitting an acoustic wave in ground, characterized by arranging an underground acoustic wave transmitting device (30) in a bore hole (12) to transmit an acoustic wave in ground, said transmitting device (30) including at least first and second source vibrators (32), with each said source vibrator (32) comprising:
  a mass body (40) arranged in an axial direction of said bore hole;
  a vibrator (34) disposed on said mass body such that the vibration direction is perpendicular to or parallel with a wall of said bore hole;
  an anvil (42) for contacting to said wall, disposed on a bore hole wall side of said vibrator; and
  a claiming mechanism (64) for pressure-contacting said anvil to said wall of said bore hole;
  wherein said first and second source vibrators (32) are substantially aligned with one another in said bore hole, with said first source vibrator (32) having a rotational position substantially 90° from a rotational position of said second source vibrator (32).

18. An underground acoustic wave transmitting method as set forth in claim 17, wherein said two source vibrators (32) which are different by 90° in azimuth of said vibrator from each other, is disposed in said bore hole (12), for propagating said acoustic wave having a longitudinal wave transmitting in an axial direction of said vibrator, and a transverse wave propagating in a perpendicular direction of said axial direction.

19. An underground acoustic wave transmitting method as set forth in claim 17, wherein said underground acoustic wave transmitting device (30) transmits a pseudo random coded acoustic wave ranging from a low frequency to a high frequency.

20. An underground acoustic wave transmitting method as set forth in claim 17 further comprising an underground acoustic wave receiving method characterized by arranging an underground acoustic wave receiving device in a bore hole (12) to receive an acoustic wave transmitted in the ground, said receiving device comprising:
  a packer (182) for closing a bottom portion of said bore hole;
  a shut-off valve (180) for closing a ground outlet of said bore hole;
  a clamping mechanism (164) for fixing a cable (150), arranged above a vibration receiver in said bore hole, to a wall of said bore hole so as to decrease tension of said cable arranged above said vibration receiver and then relax said cable.

21. An underground acoustic wave receiving method as set forth in claim 20, wherein said receiving device receives a pseudo random coded acoustic wave.

22. An underground acoustic wave transmitting method as set forth in claim 17 wherein said transmitting device (30) is provided with balloon type reflection plate (300) for preventing dissipation of energy above and/or below said source vibrator (32).

23. An underground acoustic wave transmitting device as set forth in claim 17, wherein said vibrator (34) is substantially elongated along a longitudinal axis, with said vibrator (34) being disposed on said mass body such said longitudinal axis is substantially perpendicular said axial direction of said bore hole.

24. An underground acoustic wave transmitting device as set forth in claim 23, wherein a plurality of said vibrators (34) are disposed on said mass body in the axial direction of said bore hole and at spaced separation from one another.

25. An underground exploration method characterized by arranging an underground acoustic wave transmitting device (30) in a bore hole (12) to transmit an acoustic wave in ground, said transmitting device (30) including at least first and second source vibrators (32), with each said source vibrator (32) comprising:
  a mass body (40) arranged in an axial direction of said bore hole;
  a vibrator (34) disposed on said mass body such that the vibration direction is perpendicular to or parallel with a wall of said bore hole;
  an anvil (42) for contacting to said wall, disposed on a bore hole wall side of said vibrator; and
  a clamping mechanism (64) for pressure-contacting said anvil to said wall of said bore hole;
  wherein said first and second source vibrators (32) are substantially aligned with one another in said bore hole, with said first source vibrator (32) having a rotational position substantially 90° from a rotational position of said second source vibrator (32).

26. An underground exploration method as set forth in claim 25, wherein a longitudinal wave, which is transmitted from said source vibrator (32) in an axial direction of said vibrator (34), is used for purpose of exploration.

27. An underground exploration method as set forth in claim 25, wherein a transverse wave, which is transmitted from said source vibrator (32) in a direction perpendicular to an axial direction of said vibrator (34), is used for purpose of exploration.

28. An underground exploration method as set forth in claim 25 further comprising a balloon type reflection plate (300) for preventing dissipation of energy above and/or below said source vibrator (32).

29. An underground acoustic wave transmitting device as set forth in claim 25, wherein said vibrator (34) is substantially elongated along a longitudinal axis, with said vibrator (34) being disposed on said mass body such that said longitudinal axis is substantially perpendicular said axial direction of said bore hole.

30. An underground acoustic wave transmitting device as set forth in claim 29, wherein a plurality of said vibrators (34) are disposed on said mass body in the axial direction of said bore hole and at spaced separation from one another.

31. An underground exploration method as set forth in claim 25 characterized by arranging an underground acoustic wave receiving device in a bore hole (112) to receive an underground acoustic wave, said receiving device comprising:
  a packer (182) for closing a bottom portion of said bore hole;
  a shut-off valve (180) for closing a ground outlet of said bore hole;
  a clamping mechanism (164) for fixing a cable (150), arranged above a vibration receiver in said bore hole, to a wall of said bore hole so as to decrease tension of said cable arranged above said vibration receiver and then relax said cable.

32. An underground acoustic wave emitting and receiving method characterized by arranging an underground acoustic wave transmitting device (30) in a bore hole (12) to transmit an acoustic wave in ground, said transmitting device (30) including at least first and second source vibrators (32), with each said source vibrator (32) comprising:
  a mass body (40) arranged in an axial direction of said bore hole;
  a vibrator (34) disposed on said mass body such that the vibration direction is perpendicular to or parallel with a wall of said bore hole;
  an anvil (42) for contacting to said wall, disposed on said bore hole wall side of said vibrator; and a clamping mechanism (64) for pressure-contacting said anvil to said wall of said bore hole, and by arranging an underground acoustic wave receiving device in another bore hole (112) to receive an underground acoustic wave, said receiving device comprising:

a packer (182) for closing a bottom portion of said another bore hole (112);

a shut-off valve (180) for closing a ground outlet of said another bore hole (112);

a clamping mechanism (164) for fixing a cable (150), arranged above a vibration receiver in said another bore hole, to a wall of said another bore hole so as to decrease tension of said cable arranged above said vibration receiver and then relax said cable;

wherein said first and second source vibrators (32) are substantially aligned with one another in said bore hole, with said first source vibrator (32) having a rotational position substantially 90° from a rotational position of said second source vibrator (32).

33. An underground acoustic wave transmitting device as set forth in claim 32, wherein said vibrator (34) is substantially elongated along a longitudinal axis, with said vibrator (34) being disposed on said mass body such that said longitudinal axis is substantially perpendicular said axial direction of said bore hole.

34. An underground acoustic wave transmitting device as set forth in claim 33, wherein a plurality of said vibrators (34) are disposed on said mass body in the axial direction of said bore hole and at spaced separation from one another.

35. An underground exploration method characterized by arranging an underground acoustic wave transmitting device (30) in a bore hole (12) to emit an acoustic wave in ground, said transmitting device (30) including at least first and second source vibrators (32), with each said source vibrator (32) comprising:

a mass body (40) arranged in an axial direction of said bore hole;

vibrator (34) disposed on said mass body such that the vibration direction is perpendicular to or parallel with a wall of said bore hole;

an anvil (42) for contacting to said wall, disposed on a bore hole wall side of said vibrator; and a clamping mechanism (64) for pressure-contacting said anvil to said wall of said bore hole, and by arranging an underground acoustic wave receiving device in another bore hole (112) to receive an underground acoustic wave, said receiving device comprising:

a packer (182) for closing a bottom portion of said another bore hole (112);

a shut-off valve (180) for closing a ground outlet of said another bore hole (112);

a clamping mechanism (164) for fixing a cable (150), arranged above a vibration receiver in said another bore hole, to a wall of said another bore hole so as to decrease tension of said cable arranged above said vibration receiver and then relax said cable;

wherein said first and second source vibrators (32) are substantially aligned with one another in said bore hole, with said first source vibrator (32) having a rotational position substantially 90° from a rotational position of said second source vibrator (32).

36. An underground exploration method as set forth in claim 35, wherein clock for said source vibrator and said vibration receiver is made independently of clock for a recorder for recording a received acoustic waveform.

37. An underground acoustic wave transmitting device as set forth in claim 35, wherein said vibrator (34) is substantially elongated along a longitudinal axis, with said vibrator (34) being disposed on said mass body such that said longitudinal axis is substantially perpendicular said axial direction of said bore hole.

38. An underground acoustic wave transmitting device as set forth in claim 37, wherein a plurality of said vibrators (34) are disposed on said mass body in the axial direction of said bore hole and at spaced separation from one another.

* * * * *